United States Patent [19]

Hood

[11] Patent Number: 4,509,287
[45] Date of Patent: Apr. 9, 1985

[54] FISH TROLLING DEVICE

[76] Inventor: Edwin I. Hood, P.O. Box 207, Eastsound, Wash. 98245

[21] Appl. No.: 503,908

[22] Filed: Jun. 13, 1983

[51] Int. Cl.³ ............................................. A01K 91/00
[52] U.S. Cl. ..................................... 43/19.2; 43/26.1; 43/43.11
[58] Field of Search ....................... 43/19.2, 26.1, 26.2, 43/27.4, 43.11

[56] References Cited

U.S. PATENT DOCUMENTS

| | | | |
|---|---|---|---|
| 3,031,790 | 5/1962 | Duryea | 43/26.1 |
| 3,623,259 | 11/1971 | Rode | 43/19.2 |
| 3,645,030 | 2/1972 | Milburn | 43/26.1 |
| 4,204,356 | 5/1980 | Smith | 43/26.1 |
| 4,312,147 | 1/1982 | Christiansen | 43/27.4 |

FOREIGN PATENT DOCUMENTS 231031  5/1944  Switzerland .......................... 43/26.1

Primary Examiner—Gene P. Crosby
Attorney, Agent, or Firm—Klarquist, Sparkman, Campbell, Leigh & Whinston

[57] ABSTRACT

A trolling device for a fishing lure includes a frame to be towed through water. A spool on the frame carries a line for attachment to the lure. A propeller driven by motion of the device through the water is connected to the spool to drive same to retrieve the line. A trip mechanism tripped by the line position alternately connects and disconnects the spool from the propeller to retrieve line or permit it to pay out, thus alternately advancing the lure secured to the line and letting the lure drop back.

7 Claims, 5 Drawing Figures

U.S. Patent   Apr. 9, 1985   Sheet 1 of 2   4,509,287
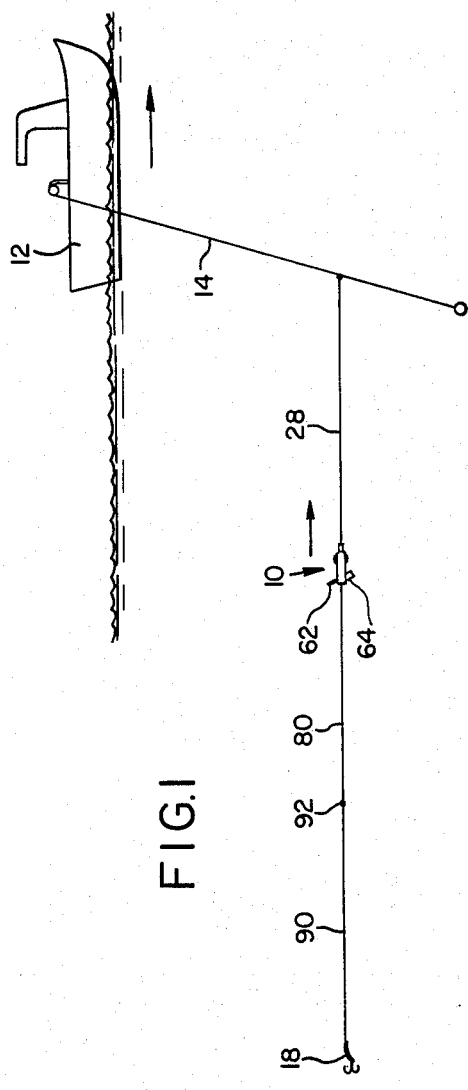
FIG.1
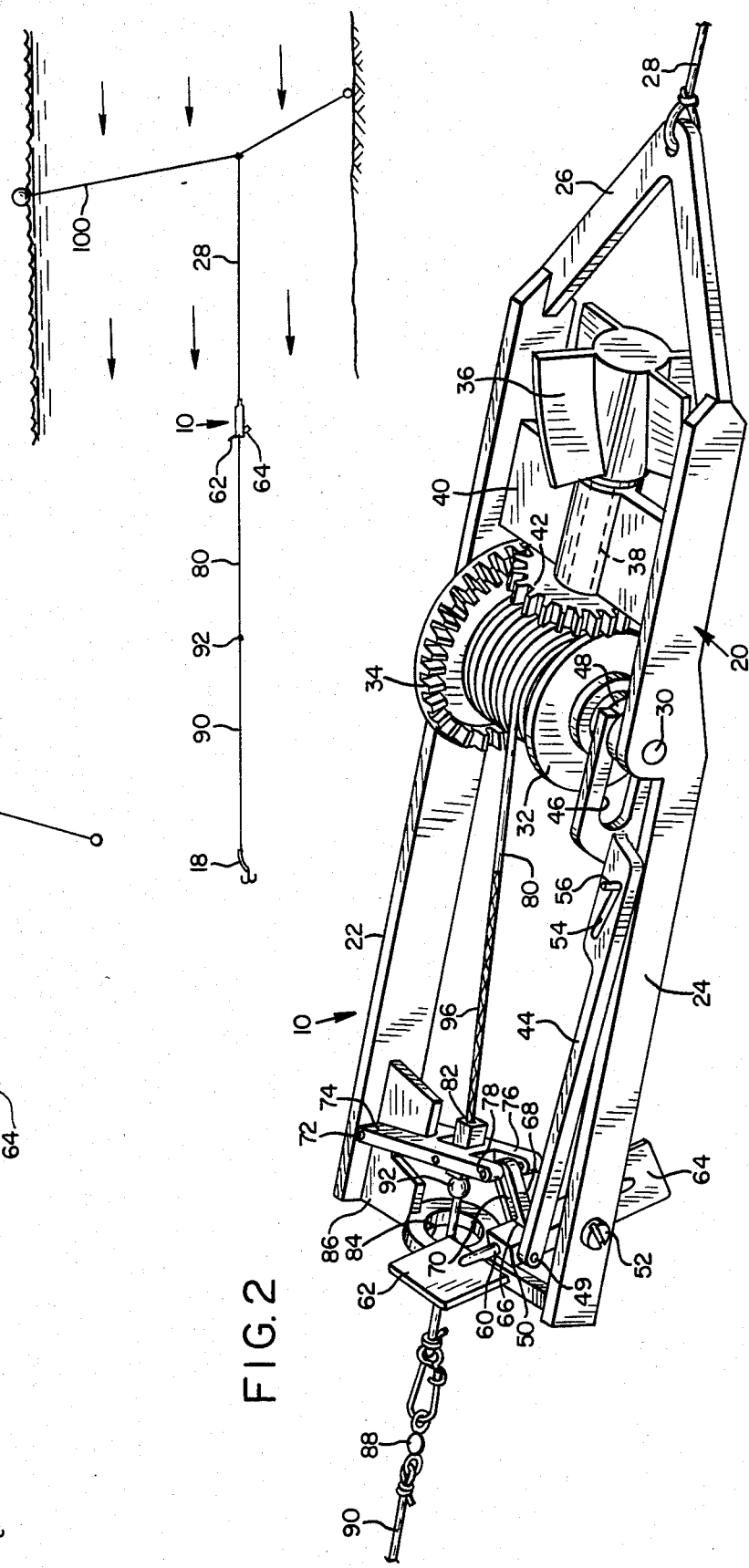
FIG.2
FIG.5

FISH TROLLING DEVICE

The present invention relates to a trolling device and, more particularly, to a device which will give motion to a lure, making it attractive to fish and particularly to salmon.

Much effort has been made over the years to develop an action to a trolled lure for salmon that will enhance or increase the frequency of the catch. The speed the lure is trolled through the water is critical to get a good response from the fish. It has been observed, for example, that on a trolling vessel, that is, on a vessel where salmon are fished for by trolling lures behind the boat, the frequency of hookups on the lures increases when the boat makes sharp turns in the water. Usually several lures are trolled behind a boat, some from each side of the vessel from outriggers. The lures on the outside of the turn obviously have their speed accelerated, while those on the inside of the turn slow down, and they in fact almost stop entirely in the water. Because the forward motion is lost, they flutter or drop through the water, perhaps like wounded bait fish. It is frequently difficult to maneuver a boat to make such turns because of weather conditions and the closeness of adjacent boats. It is not known exactly why a fish will strike lures as they go through their various actions, but it is known that salmon appear to strike and attack bait that simulates a wounded herring or like bait fish. Thus, sport fishermen in particular have sometimes been successful in their fishing efforts by alternately accelerating and letting the lure fall back from a boat. A commercial salmon fisherman will be trolling several lures from a downrigger, and it is not feasible for a troller to try to accelerate and let a bait drop back by pulling in and releasing lines.

Many devices have been devised heretofore to impart jigging action to a bait. In U.S. Pat. No. 798,344, Holz, et al, motion is imparted to a lure by a spring motor-driven propeller. In U.S. Pat. No. 2,643,478, Paulsen, an ice-fishing device is shown in which an arm is elevated and lowered by a motor to lift and drop a bait.

U.S. Pat. No. 3,031,790, Derea, shows a somewhat similar bait-jigging device.

U.S. Pat. No. 3,645,030, Milburn, shows a bobber with a motor-driven device to jig a bait suspended below the bobber.

The Swift U.S. Pat. No. 4,204,356, shows a trolling device having a reciprocating arm mounted on a wheel that is rotated by the motion of the boat through the water. The reciprocation of the arm causes a bait attached to the arm to be moved forwardly and dropped back relative to the motion of the trolling device.

U.S. Pat. No. 4,312,147, Christensen, also shows an arrangement for jigging squid bait in which the line is retrieved onto a rotating drum.

SUMMARY OF THE INVENTION

The present invention comprises a device adapted to be towed under water. A lure is trolled behind the device, the action of the device being such as first to accelerate the lure and then to permit it to drop back relative to the motion of the trolling boat. The device includes a frame which has mounted thereon a reel upon which is wound a leader that trolls behind the device and which is connected to a fishing lure. A propeller is mounted on the frame so as to be driven by the flow of water past the device as it is towed. Means are provided to drive the spool at selected times by the propeller. A triggering mechanism is provided for selectively connecting and disconnecting the propeller means to the spool, which trigger is operated by means associated with the leader when a predetermined amount of the leader has been played off from the spool or, alternatively, retrieved. The operation of this triggering means will cause the spool to be driven by the propeller so as to rewind the leader until a predetermined amount of the leader is rewound on the spool when the triggering system will again be actuated to disengage the spool from the propeller and permit the leader to be withdrawn from the spool. Thus, the lure is first pulled through the water at a fast rate of speed as the loader is wound on the spool and thereafter allowed to fall back in the water as the spool freely rotates and the line plays out due to the friction of the drag of the lure and the line in the water. The alternate rapid acceleration and next the substantially motionless action of the lure is attractive to fish and will enhance the catch of a fish over a given period of time.

DESCRIPTION OF THE DRAWINGS

FIG. 1 is a schematic view showing how the device of the invention is utilized in a downrigger trolling arrangement;

FIG. 2 is a perspective view of a device constructed in accordance with my invention;

FIG. 5 is a view showing how such a device may be employed in a fixed location in a water current.

Figure 3:
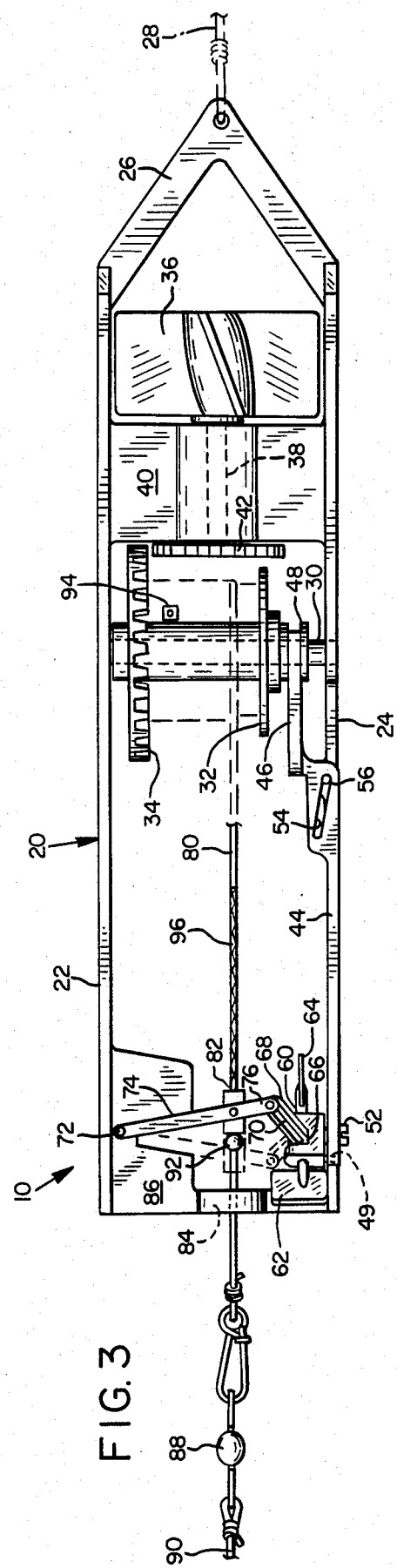
FIG. 3 is a top view thereof.

Referring first to FIG. 1, the trolling device 10 of the invention is adapted to be trolled through the water from a boat 12. It may be attached to the trolling wire 14 of a downrigger to the lower end of which is secured a heavy sinker 16 so that the downrigger remains relatively vertical in the water as the boat moves through the water. The downrigger is periodically retrieved into the boat so as to capture any fish that may have been hooked on the lure 18 trailing from the device. A multiple number of devices 10 may be towed from a single downrigger. The device 10 may also be trolled directly from a fishing rod.

Figure 4:
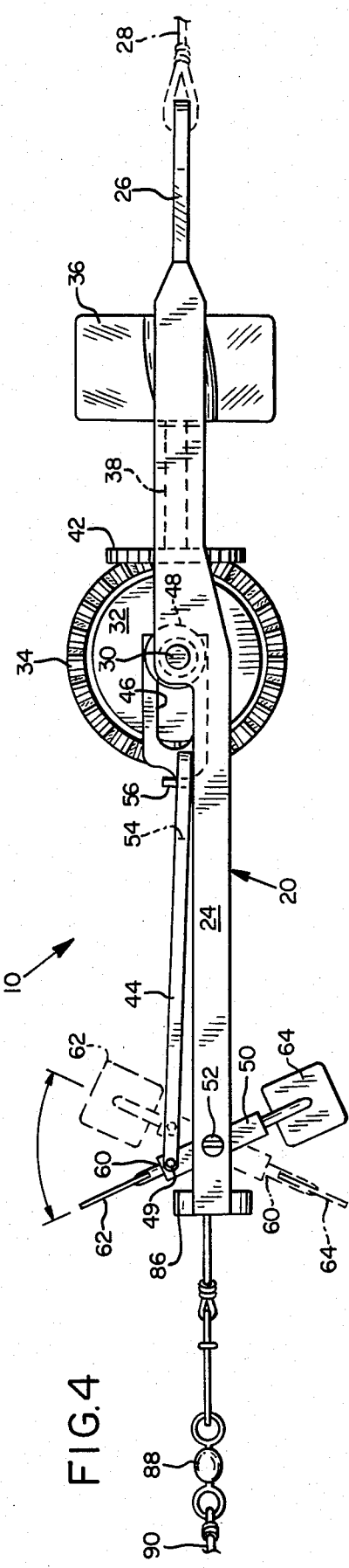
FIG. 4 is a side view thereof.

Referring now to FIGS. 2-4, the illustrated embodiment of the invention comprises an elongate frame 20 consisting of two parallel side members 22, 24 and a tapered forward end 26 to which a towing line 28 is adapted to be connected to tow the device from the downrigger. Preferably, a shock-absorbing device (not shown) is incorporated in the towing line to minimize the possibility of the line breaking from the stress of a fish strike. Extending transversely between the side members 22, 24 is a shaft 30 upon which a spool 32 is rotatably mounted. The spool 32 is shiftable axially of the shaft 30. A bevel gear 34 is attached to said spool at one end thereof.

Means are provided for driving the spool 32 to cause rotation of the spool. The illustrated means comprises a propeller 36 mounted toward the forward end of the frame 20 upon a shaft 38 journaled in a cross frame member 40. A bevel gear 42 is mounted on the opposite end of the shaft 38 and is adapted to be engaged by the bevel gear 34 in one position of the spool, the gears being out of engagement in the other position of the spool.

Means are provided to shift the spool 32 between its positions including a lever 44 having a yoke 46 straddling the shaft 30 and embracing a flanged hub 48 extending to the side of the spool 32. The opposite end of the lever 44 is pivotally secured by a pin 49 to a tubular arm 50 which is pivotally mounted to frame member 24 near the trailing end thereof by a pin 52. The intermediate portion of the lever 44 is formed with an angularly disposed cam slot 54 through which extends a cam pin 56. Thus, as arm 50 pivots to move the lever 44 forwardly, the spool 32 is shifted to disengage the gears 34, 42. When the arm 50 pivots to move the lever rearwardly, the spool is shifted the opposite direction to bring the gears into engagement, whereby the spool will be driven as the propeller 36 rotates.

Means are provided for causing the arm 50 to pivot between the alternate positions mentioned. Extending through the arm is an axle 60 having a flat vane 62 on one end thereof and a further flat vane 64 on the opposite end disposed at right angles to vane 62. The axle 60 is rotatable in the arm 50. As will be apparent, the vane which is disposed crosswise to the direction of movement will be urged rearwardly by the force of the impinging water, thus shifting the arm in the corresponding direction.

Means are provided alternately to position the vanes 62, 64 at right angles to the direction of travel. Fixed to the axle 60 and extending radially therefrom outwardly of the arm 50 through a slot 66 is a lever 68 having a longitudinally extending slot 70 therein. Pivotally mounted to the frame member 22 by a pin 72 is a second lever or trigger bar 74 which is plate-like in its center portion and has a bifurcated end 76 straddling the lever 68. A pin 78 extends through the bifurcations of trigger bar 74 and the slot 68. The throw of the levers 68, 74 is 90 degrees so as to enable shifting of first one vane 62 or 64 and then the other into arm shifting position.

The shifting of the trigger bar 74 will now be described. Connected to and adapted to be wound on the spool 32 is a line 80 which extends through an opening 82 in the trigger bar 74 and also through an opening 84 in the rearmost cross frame member 86. The free end of the line 80 is adapted to be connected by a suitable swivel 88 or the like to a leader 90 which in turn is connected to the lure 18. The line 80 has provided thereon two stops, one of which, 92, is near the free or swivel end of the line, the other of which, indicated at 94 in FIG. 3, is positioned a substantial distance from stop 92. Assuming a condition wherein the gears 34, 42 are engaged to rotate the spool 32, vanes 62, 64 will be in the dotted line position of FIGS. 2 and 3, and the line 80 will be wound in. When the stop 92 engages the trigger bar 74, it will cause the bar to move to its opposite, solid line position which will in turn rotate vane 62 to its crosswise position, whereupon arm 50 will be thrown to retract lever 44 causing gears 34, 42 to disengage and freeing spool 32. The drag of the water on the lure will then cause the line 80 to be withdrawn from the spool until stop 94 engages the trigger bar 74 moving it to its opposite position. This will once again cause gears 34, 42 to be engaged so that spool 32 is driven to retrieve the line 80 until stop 92 engages the lever 74 and moves it to its opposite position whereupon the spool 32 will once again be free spooling. Thus, the lure 18 will alternately be moved toward the device 10 and then be released to fall back and move relatively slowly and flutter in the water. This darting lure action is somewhat duplicative of wounded or ill bait fish which salmon seem most readily to pursue. Thus, such lure action enhances the probability of a salmon or other fish striking the trolled lure.

Preferably, the line 80 is provided with an elastic section 96 immediately forwardly of the stop 92 so as to relieve some of the tension imposed on the line 80 by the continued rotation of spool 32 during the time interval between the engagement of trigger bar 74 will stop 92 and the disengagement of gears 34, 42. This relief of tension will tend to prevent the line 80 from winding too tightly on spool 32 and binding.

The stops 92, 94 may be provided by any suitable means as, for example, by knotting a short length of line on the line 80 at the desired position of each stop. The spacing between knots may vary as the user selects from a few inches to many feet. The reaction of fish seem to vary from day to day and even from hour to hour. Consequently, the fall back or dwell period of lure as the spool 32 turns freely may be varied to enhance a fish strike, as the operator desires, by changing stop positions.

It will also be apparent that the trolling device can be used where a steady river or ocean current prevails by attaching it to a fixed buoy line 100 as illustrated in FIG. 5, the current causing the mechanism to operate to first cause the spool to wind in line and thereafter to release it, giving action to lure 18.

Having described the invention in what is considered to be a preferred embodiment thereof, it is to be understood that the invention is not to be limited other than by the provisions of the following claims.

I claim:

1. A trolling device for a fishing lure comprising:
   a frame adapted to be towed through a body of water,
   a spool rotatably mounted on said frame and a length of line connected at one end to said spool and adapted to be wound thereon,
   said line trailing from said frame as said frame is towed, and being adapted for connection to a lure,
   and drive means means on said frame for alternately driving said spool to cause said line to wind upon said spool and thereafter to reverse its rotation to unwind said line,
   whereby said lure will alternately be accelerated toward said frame and next be caused to drop back from said frame as said frame is towed through the water.

2. A trolling device as set forth in claim 1 wherein said drive means includes a propeller adapted to be driven by water pressure as the device is towed through a body of water,
   and means for intermittently connecting said propeller to said spool to drive the same.

3. A trolling device as set forth in claim 2 wherein said connecting means includes vane means adapted to be moved by water pressure as the device is towed through the water between a first position wherein said spool is drivingly connected to said propeller and a second position wherein said spool is disconnected from said propeller.

4. A trolling device as set forth in claim 3 including means on said line for causing shifting of said vane means between said positions.

5. A trolling device as set forth in claim 3 wherein said spool is rotatably mounted on a shaft and is axially movable thereon between a first position in driving engagement with said propeller and a second position out of engagement with said propeller.

6. A device as set forth in claim 5 including spool shifting means operatively connected to said vane means for shifting said spool between said positions.

7. A trolling device for a fishing lure comprising:

an elongate frame having means at a forward end thereof for connecting the same to a towing line, a transversely extending shaft mounted on said frame, a spool rotatably mounted on said shaft and shiftable axially thereon, between a first position and a second position, gear means mounted on said frame and adapted operatively to engage said spool to drive the same in said first position of said spool and to be disengaged from said spool in the second position of said spool, propeller means mounted on said frame adapted to be driven by the motion of said device as it is towed through a body of water, means drivingly connecting said propeller means to said gear means, means for shifting said spool between said first and second positions comprising a shifting lever having one end operatively engaging said spool, and shiftable longitudinally of said shaft, a lure towing line fixed at one end to said spool and adapted to be wound upon said spool as said spool is driven by said gear means, the other end of said towing line extending rearwardly of said frame as the same is towed, lever shifting means comprising a tubular arm pivotally mounted on said frame near said trailing end about an axis parallel to the axis of said shaft, means pivotally attaching the opposite end of said shifting lever to said arm, at a position spaced from the pivot axis of said arm, a cam slot in said arm extending at an acute angle with respect to the longitudinal axis of said frame whereby shifting of said lever fore and aft of said frame as said arm pivots causes said one end of said lever to shift said spool between said first and second positions, an axle extending through said arm and a pair of flat vanes, one on each of the opposite ends of said arm, said vanes disposed at right angles to one another whereby positioning of a vane at right angles to the direction of travel will cause the corresponding end of said arm to move toward the trailing end of said frame, and means for causing said axle to rotate alternately to position said vanes at right angles to said direction of travel, said axle means including a first lever fixed at one end to said axle and extending radially therefrom, and a second lever operatively connected at one end to said first lever, said second lever being pivotally connected at its other end to said frame, said trolling line extending freely through said second lever, a first stop means positioned on said line between said second lever and said spool and a second stop means on said line positioned on the opposite side of said second lever whereby engagement of a stop with said second lever will effect corresponding movement thereof to shift said first lever and effect rotation of said axle from one position thereof to the other which in turn will result in pivotal movement of said arm and shifting of said spool from one of its positions to the other.

* * * * *